(12) United States Patent
Dean et al.

(10) Patent No.: US 7,691,484 B2
(45) Date of Patent: *Apr. 6, 2010

(54) COATING COMPOSITIONS SUITABLE FOR USE AS A WOOD STAIN AND/OR TONER

(75) Inventors: Roy E. Dean, Lower Burrell, PA (US); John M. Dudik, Apollo, PA (US); Shawn P. Duffy, Cheswick, PA (US); Richard J. Foukes, Mars, PA (US); Michael J. Ziegler, Cranberry Township, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 362 days.

This patent is subject to a terminal disclaimer.

(21) Appl. No.: 11/737,854

(22) Filed: Apr. 20, 2007

(65) Prior Publication Data

US 2007/0256256 A1 Nov. 8, 2007

Related U.S. Application Data

(60) Provisional application No. 60/797,441, filed on May 4, 2006.

(51) Int. Cl.
*C09D 15/00* (2006.01)
*B32B 27/10* (2006.01)
*C08L 67/00* (2006.01)

(52) U.S. Cl. .................. 428/481; 428/514; 428/511; 522/64; 522/88; 522/179; 522/141; 525/36; 525/39

(58) Field of Classification Search ............. 522/64, 522/81, 83, 107, 141, 136, 143, 88, 179; 428/481, 511, 514; 525/36, 39
See application file for complete search history.

(56) References Cited

U.S. PATENT DOCUMENTS

| | | | |
|---|---|---|---|
| 4,394,475 A | 7/1983 | Temple et al. | 524/262 |
| 5,084,354 A | 1/1992 | Krankkala et al. | 428/414 |
| 6,458,885 B1 | 10/2002 | Stengel et al. | 524/507 |
| 6,777,027 B2 | 8/2004 | Daly et al. | 427/180 |
| 6,794,055 B2 | 9/2004 | Dean et al. | 428/537.1 |
| 6,833,186 B2 | 12/2004 | Perrine et al. | 428/329 |
| 2004/0013895 A1 | 1/2004 | Dean et al. | 428/515 |
| 2004/0151931 A1 | 8/2004 | Dean et al. | 428/507 |

FOREIGN PATENT DOCUMENTS

| | | |
|---|---|---|
| EP | 0 328 323 A1 | 8/1989 |
| JP | 06336575 | 12/1994 |
| WO | WO 99/47617 | 9/1999 |

*Primary Examiner*—Susan W Berman
(74) *Attorney, Agent, or Firm*—Donald R. Palladino

(57) ABSTRACT

Coating compositions are disclosed that include a film-forming resin, a colorant, a long chain alkyl group containing polymerizable ethylenically unsaturated compound, and a diluent. Also disclosed are substrates at least partially coated with such compositions, substrates at least partially coated with a multi-layer composite coating comprising at least one coating layer deposited from such compositions, and methods for improving the adhesion of a multi-layer composite coating system to a porous substrate.

13 Claims, No Drawings

COATING COMPOSITIONS SUITABLE FOR USE AS A WOOD STAIN AND/OR TONER

CROSS-REFERENCE TO RELATED APPLICATIONS

This application claims the benefit of U.S. Provisional Patent Application Ser. No. 60/797,441, filed May 4, 2006, which is incorporated by reference herein in its entirety.

FIELD OF THE INVENTION

The present invention relates to, among other things, coating compositions, substrates at least partially coated with a multi-layer composite coating system comprising a coating layer deposited from such coating compositions, and methods for improving the adhesion of multi-layer composite coating systems to substrates.

BACKGROUND OF THE INVENTION

There are a number of considerations relevant in the art of protective and decorative coating systems for substrates, such as wood substrates, including cabinets, floors, furniture, and the like. As will be appreciated, such coating systems are often made up of more than one coating layer. Porous substrates, such as wood, for example, are often coated with multi-layer composite coating systems that include a toner layer, a stain layer, a sealer layer, and a topcoat layer. Typically, the toner and/or stain layer(s) are coloring layers, i.e., they provide coloring. The sealer layer is often a protective layer that is sanded to provide a smooth finish, while the topcoat layer is often a protective layer that provides surface properties, such as mar and scratch resistance.

In many cases, one or more of the various coating layers in such multi-layer composite coating systems are deposited from coating compositions that contain radiation curable materials, such as resins that are curable by exposure to ultraviolet ("UV") radiation. Such resins can provide coatings exhibiting excellent properties, such as adhesion properties, and are often desirable for wood finish applications because of the heat sensitivity of wood, which often makes certain thermosetting coatings unfavorable.

There are some drawbacks, however, to using certain radiation curable materials in such coating compositions. For example, when a wiping stain and/or toner composition is desired, toxicity issues can prevent the inclusion of certain radiation curable materials.

As a result, it is desired to provide coating compositions, such as stain and toner compositions suitable for use as a wiping stain and/or toner, which can be used in combination with coating layers comprising radiation curable materials to provide multi-layer composite coating systems exhibiting acceptable properties, including acceptable adhesion properties and resistance to blistering.

SUMMARY OF THE INVENTION

In certain respects, the present invention is directed to coating compositions, such as wood stain and/or toner compositions, which comprise a film-forming resin, a colorant, a long chain alkyl group containing polymerizable ethylenically unsaturated compound, and a diluent.

In other respects, the present invention is directed to coating compositions, such as wood stain and/or toner compositions, which comprise a film-forming resin, a radiation cure initiator, a colorant, a long chain alkyl group containing polymerizable ethylenically unsaturated compound, and a diluent.

In still other respects, the present invention is directed to methods for improving the adhesion of a multi-layer composite coating system to a porous substrate. These methods of the present invention comprise the step of including a radiation cure initiator and a long chain alkyl group containing polymerizable ethylenically unsaturated compound to a wiping stain and/or toner composition from which a colorant layer of the multi-layer composite coating system is deposited, wherein the multi-layer coating system comprises at least one coating layer deposited from a radiation curable composition.

In yet other respects, the present invention is directed to multi-layer composite coating systems comprising a colorant layer and at least one of a sealer layer and a topcoat layer. The colorant layer of these coating systems is deposited from a coating composition comprising a film-forming resin, a radiation cure initiator, a colorant, a long chain alkyl group containing polymerizable ethylenically unsaturated compound, and a solvent. Moreover, the sealer layer and/or topcoat layer is deposited from a radiation curable composition and is applied over at least a portion of the colorant layer.

The present invention is also directed to substrates at least partially coated with such coating compositions or such multi-layer composite coating systems as well as methods for coating substrates.

DETAILED DESCRIPTION OF EMBODIMENTS OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

In certain embodiments, the present invention is directed to coating compositions, such as stain or toner compositions, suitable for application over porous substrates, such as wood. As used herein, the term "porous substrate" refers to substrates that contain pores or interstices that allow a liquid composition to penetrate the surface of the substrate. As used herein, the term "stain" refers to a translucent composition that can color a porous substrate, such as wood, while allowing some of the substrate's natural color and grain to show through. As used herein, the term "toner" refers to a composition that performs a function similar to a stain in that it can color a porous substrate, however, a "toner" is typically a low solids composition (no more than 5 weight percent solids and at least 95 weight percent solvent) and is typically applied to a substrate at a low film thickness before a stain is applied.

In certain embodiments, the stain or toner compositions of the present invention are suitable for use as a wiping stain or wiping toner. As used herein, the terms "wiping stain" and "wiping toner" respectively refer to stain and toner compositions that are suitable for application to a porous substrate wherein, after being applied to the substrate and allowed to penetrate the surface thereof, excess material may be safely removed by wiping with a cloth or similar device. "Wiping stains" and "wiping toners", for purposes of the present invention, should be distinguished from "non-wiping" or "penetrating" stains or toners, wherein the composition, when applied to a porous substrate, penetrates the substrate surface to such an extent that there is no significant amount of excess material remaining on the surface to be removed.

Also, the terms "wiping stain" and "wiping toner", for purposes of the present invention, refer to compositions that are substantially free or, in many cases, completely free, of (meth)acrylates that do not include a long chain alkyl group (as described below), which, if present in any significant amount would render the composition unsuitable for use in a wiping application wherein personnel can be exposed to the uncured composition. Examples of (meth)acrylates that do not include a long chain alkyl group, which are, in certain embodiments, substantially or completely absent from the compositions of the present invention, include methyl(meth)acrylate, ethyl(meth)acrylate, hydroxyethyl(meth)acrylate, and propyl(meth)acrylate, among others.

As used herein, the term "(meth)acrylate" is meant to include both acrylates and methacrylates. As used herein, the terms "substantially free" and "substantially absent" mean that the material being discussed is present in a composition, if at all, as an incidental impurity. In other words, the material does not affect the properties of the composition. As used herein, the term "completely free" means that the material being discussed is not present in a composition at all.

The coating compositions of the present invention comprise a film-forming resin. As used herein, the term "film-forming resin" refers to resins that can form a self-supporting continuous film on at least a horizontal surface of a substrate upon removal of any diluents or carriers present in the composition or curing.

The film-forming resin utilized in the compositions of the present invention is not limited and may include, for example, any film-forming resin typically used in the art, such as polyurethanes, acrylics, vinyls, melamines, polyvinylchlorides, polyolefins, polyureas, polycarbonates, polyethers, polyesters, epoxies, silicones, polyamides, and the like, so long as, in certain embodiments, the composition is suitable for use as a wiping stain or wiping toner. In certain embodiments, for example, the film-forming resin comprises an alkyd resin. As used herein, the term "alkyd resin" denotes a synthetic resin that is the reaction product of a polybasic acid or anhydride, a polyhydric alcohol, and an oil fatty acid. Such resins are often prepared by polycondensation of various polybasic acids, polyhydric alcohols and fatty acids. As used herein, the term "oil fatty acid" includes, for example, drying oils, semi-drying oils, and non-drying oils, including mixtures thereof. As will be appreciated by those skilled in the art, when one or more drying oils, one or more semi-drying oils or mixtures of drying and semi-drying oils are used, the coating compositions of the present invention will be capable of undergoing oxidative cure. Similarly, if a mixture of at least one of the drying oils or the semi-drying oils with a non-drying oil is used, with the mixture being predominantly drying and/or semi-drying, the compositions will also undergo oxidative cure. "Predominantly drying" and/or "semi-drying" means that at least about 45 percent of the oils used are drying and/or semi-drying. Both drying and semi-drying oils contain carbon-carbon double bonds that are capable of undergoing oxidative crosslinking, whereas nondrying oils either don't contain such bonds or don't contain a sufficient number of such bonds to effect cure.

Examples of suitable drying and semi-drying oils include castor oil, dehydrated castor oil, cottonseed oil, fish oil, linseed oil, menhaden oil, oiticica oil, palm kernel oil, perilla oil, safflower oil, sardine oil, soybean oil, sunflower oil, tall oil, tung oil, and walnut oil. Examples of suitable non-drying oils include valeric acid, heptanoic acid, 2-ethyl hexanoic acid, pelargonic acid, isononanoic acid, lauric acid, coconut oil fatty acid, stearic acid and branched fatty acids containing 18 carbon atoms. Predominantly drying/semi-drying oils are often more appropriate for use in the present stains.

Suitable polyhydric alcohols that can be used in forming such alkyd resins include glycerol, neopentyl glycol, cyclohexanedimethanol, ethylene glycol, propylene glycol, pentaerythritol, neononyl glycol, diethylene glycol, dipropylene glycol, trimethylene glycol, trimethylolpropane, dipentaerythritol, tripentaerythritol, and the like.

Suitable polybasic acids/anhydrides that can be used in forming such alkyd resins include polycarboxylic acids and anhydrides thereof. Examples of suitable polycarboxylic acids include phthalic acid, isophthalic acid, terephthalic acid, tetrahydrophthalic acid, hexahydrophthalic acid, adipic acid, azelaic acid, glutaric acid, 3,3-diethylglutaric acid, malonic acid, pimelic acid, sebacic acid, suberic acid, succinic acid, 2,2-dimethylsuccinic acid, 2-methylsuccinic acid, dodecenylsuccinic acid, itaconic acid, fumaric acid, maleic acid, citraconic acid, diethyl maleic acid, and trimellitic acid; the anhydrides of those polybasic acids are also suitable. Polybasic acids having greater than three acid moieties or the higher polyfunctional alcohols should not be utilized in amounts that will cause the alkyd resin to gel during preparation.

In certain embodiments, such as certain instances where the composition comprises a toner composition, the film-forming resin comprises a cellulosic resin. As used herein, the term "cellulosic resin" refers to the generally known thermoplastic polymers which are derivatives of cellulose, examples of which include: nitrocellulose; organic esters and mixed esters of cellulose such as cellulose acetate, cellulose propionate, cellulose butyrate, and cellulose acetate butyrate; and organic ethers of cellulose such as ethyl cellulose.

In certain embodiments, such as certain instances where the coating composition comprises a stain, the film-forming resin is present in the coating compositions of the present invention in an amount of 0.25 up to 15 percent by weight or, in some embodiments, 9 up to 15 percent by weight, or, in yet other embodiments, 10 up to 12 percent by weight, based on the total weight of the composition. In other embodiments, such as certain instances where the coating composition comprises a toner, the film-forming resin is present in the coating compositions of the present invention in an amount of 0.25 up to 5 percent by weight or, in some embodiments, 0.5 up to 2 percent by weight, or, in yet other embodiments, 0.5 up to 1.5 percent by weight, based on the total weight of the composition.

In certain embodiments, the coating compositions of the present invention also comprise a radiation cure initiator. As used herein, the term "radiation cure" refers to polymerization that occurs upon exposure of a material to actinic radiation, such as an electron beam (EB), UV light, or visible light.

Radiation cure mechanisms include cationic and/or free radical cure mechanisms. As those skilled in the art will appreciate, in a cationic cure mechanism, the reactive functionality of a compound reacts by means of positively charged chemical species, while, in a free-radical cure mechanism, the reactive functionality of a compound reacts by means of free radical (uncharged) intermediate species.

In certain embodiments, the radiation cure initiator comprises a photoinitiator selected from a cationic photoinitiator and/or a free radical photoinitiator. As used herein, the term "cationic photoinitiator" refers to photoinitiators that initiate radiation cure by a cationic cure mechanism, while the term "free radical photoinitiator" refers to materials that initiate radiation cure by a free-radical cure mechanism. For example, in cases where the coating compositions of the present invention are to be used in a coating system in conjunction with a coating layer deposited from a radiation curable composition that comprises a radiation curable material susceptible to cationic cure, as described in more detail below, it is often desirable to include a cationic photoinitiator in the coating composition of the present invention. Conversely, in cases where the coating compositions of the present invention are to be used in a coating system in conjunction with a coating layer deposited from a radiation curable composition that comprises a radiation curable material susceptible to free radical cure, as described in more detail below, it is often desirable to include a free radical photoinitiator in the coating composition of the present invention.

Examples of cationic photoinitiators suitable for use in the present invention include, for example, onium salts, aromatic diazonium salts of complex halides, certain metallocenes, and combinations thereof.

Suitable onium salts include, for example, those having the formulas, $R_2I^+MX_z^-$, $R_3S^+MX_z^-$, $R_3Se^+MX_z^-$, $R_4P^+MX_z^-$, and $R_4N^+MX_z^-$, wherein each R is an organic group having from 1 to 30 carbon atoms, for example, aromatic carboxylic groups having from 6 to 20 carbon atoms. Each R group can be substituted with from 1 to 4 monovalent hydrocarbon groups, for example alkoxy groups having from 1 to 8 carbon atoms, alkyl groups having from 1 to 16 carbon atoms, nitro, chloro, bromo, cyano, carboxyl, mercapto, or aromatic heterocyclic groups exemplified by pyridyl, thiophenyl, and pyranyl. $MX_z^-$ is a non-basic, non-nucleophilic anion, for example, an inorganic anion such as $BF_4^-$, $B(C_6F_5)_4^-$, $PF_6^-$, $AsF_6^-$, $SbF_6^-$, $SbCl_6^-$, $HSO_4^-$, $ClO_4^-$, $FeCl_4^-$, $SnCl_6^-$, or $BiCl_5^-$; the anion of an organic sulfonic acid, such as benzene sulfonic acid, dodecylbenzene sulfonic acid, or 3-nitrobenzene sulfonic acid; or the anion of a perfluoroalkylsulfonic acid, for example perfluorobutanesulfonic acid, perfluoroethanesulfonic acid, perfluorooctanesulfonic acid, or a combination thereof.

More specific examples of suitable onium salts are diaryliodonium salts of sulfonic acid; diaryliodonium salts of boronic acids, for example, tolyl cumyliodonium tetrakis(pentafluorophenyl)borate; bis(dodecyl phenyl)iodonium hexafluoroarsenate; bis(dodecylphenyl)iodonium hexafluoroantimonate; dialkylphenyl iodonium hexafluoroantimonate; triarylsulfonium salts of sulfonic acid; triarylsulfonium salts of perfluoroalkylsulfonic acids; and triarylsulfonium salts of aryl sulfonic acids; triarylsulfonium salts of perfluoroalkylsulfonic acids, or a combination thereof.

Suitable aromatic diazonium salts of complex halides, include, for example, 2,4-dichlorobenzenediazonium tetrachloroferrate(III), p-nitrobenzenediazonium tetrachloroferrate(III), p-morpholinobenzenediazonium tetrachloroferrate (III), 2,4-dichlorobenzenediazonium hexachlorostannate (IV), p-nitrobenzenediazonium hexachlorostannate(IV), 2,4-dichlorobenzenediazonium tetrafluoroborate, or a combination thereof.

Also suitable are certain metallocenes, for example the ferrociniums having the formula $[R^a(Fe^{11}R^b)_c]_d^{+c}[x]_c^{-d}$, wherein, c is 1 or 2; d is 1, 2, 3, 4 or 5; X is a non-nucleophilic anion, for example $BF_4^-$, $PF_6^-$, $AsF_6^-$, $SbF_6^-$, $SbF_5(OH)^-$, $CF_3SO_3^-$, $C_2F_5SO_3^-$, $n-C_3F_7SO_3^-$, $n-C_4F_9SO_3^-$, $n-C_6F_{13}SO_3^-$, $n-C_8F_{17}SO_3^-$, $C_6F_5SO_3^-$, phosphorus tungstate, or silicon tungstate; $R^a$ is a pi-arene, and $R^b$ is an anion of a pi-arene, such as a cyclopentadienyl anion. Examples of suitable pi-arenes are toluene, xylene, ethylbenzene, cumene, methoxybenzene, methylnaphthalene, pyrene, perylene, stilbene, diphenylene oxide and diphenylene sulfide. An example of a visible light cationic photoinitiator is $(\eta_5$-2,4-cyclopentadien-1-yl) $(\eta_6$-isopropylbenzene)-iron(II) hexafluorophosphate, available under the trade name IRGACURE 261 from Ciba. Other commercially available cationic photoinitiators suitable for use in the present invention include CYRACURE UVI-6992 and CYRACURE UVI-6976 from Dow Chemical Company.

To increase the light efficiency, or to sensitize the cationic photoinitiator to specific wavelengths, it is also possible, depending on the type of initiator, to use sensitizers. Examples are polycyclic aromatic hydrocarbons or aromatic keto compounds, for example benzoperylene, 1,8-diphenyl-1,3,5,7-octatetraene, or 1,6-diphenyl-1,3,5-hexatriene.

Examples of free radical photoinitiators suitable for use in the present invention include, for example, alpha-cleavage photoinitiators and hydrogen abstraction photoinitiators. Cleavage-type photoinitiators include acetophenones, α-aminoalkylphenones, benzoin ethers, benzoyl oximes, acylphosphine oxides and bisacylphosphine oxides and mixtures thereof. Abstraction-type photoinitiators include benzophenone, Michler's ketone, thioxanthone, anthraquinone, camphorquinone, fluorone, ketocoumarin and mixtures thereof.

Specific nonlimiting examples of free radical photoinitiators that may be used in the coating compositions of the present invention include benzil, benzoin, benzoin methyl ether, benzoin isobutyl ether benzophenol, acetophenone, benzophenone, 4,4'-dichlorobenzophenone, 4,4'-bis(N,N'-dimethylamino)benzophenone, diethoxyacetophenone, fluorones, e.g., the H-Nu series of initiators available from Spectra Group Ltd., 2-hydroxy-2-methyl-1-phenylpropan-1-one, 1-hydroxycyclohexyl phenyl ketone, 2-isopropylthioxantone, α-aminoalkylphenone, e.g., 2-benzyl-2-dimethylamino-1-(4-morpholinophenyl)-1-butanone, acylphosphine oxides, e.g., 2,6-dimethylbenzoyldiphenyl phosphine oxide, 2,4,6-trimethylbenzoyldiphenylphosphine oxide, bis(2,4,6-trimethylbenzoyl)phenyl phosphine oxide, 2,6-dichlorobenzoyldiphenylphosphine oxide, and 2,6-dimethoxybenzoyldiphenylphosphine oxide, bisacylphosphine oxides, e.g., bis (2,6-dimethyoxybenzoyl)-2,4,4-trimethylepentylphosphine oxide, bis(2,6-dimethylbenzoyl)-2,4,4-trimethylpentylphosphine oxide, bis(2,4,6-trimethylbenzoyl)-2,4,4-trimethylpentylphosphine oxide, and bis(2,6-dichlorobenzoyl)-2,4,4-trimethylpentylphosphine oxide, and mixtures thereof.

In certain embodiments, the radiation cure initiator is present in the coating compositions of the present invention in an amount of 0.01 up to 10 percent by weight or, in some embodiments, 0.01 up to 5 percent by weight, or, in yet other embodiments, 0.01 up to 2 percent by weight, based on the total weight of the composition.

Certain embodiments of the coating compositions of the present invention also comprise a colorant. As used herein, the term "colorant" means any substance that imparts color and/or other opacity and/or other visual effect to the composition. The colorant can be added to the coating in any suitable form, such as discrete particles, dispersions, solutions and/or flakes. A single colorant or a mixture of two or more colorants can be used in the coatings of the present invention.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DP-PBO red"), titanium dioxide, carbon black and mixtures thereof. The terms "pigment" and "colored filler" can be used interchangeably.

Example dyes include, but are not limited to, those that are solvent and/or aqueous based such as pthalo green or blue, iron oxide, bismuth vanadate, anthraquinone, perylene, aluminum and quinacridone.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800 B2, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in United States Patent Application Publication 2005-0287348 A1, filed Jun. 24, 2004, U.S. Provisional Application No. 60/482,167 filed Jun. 24, 2003, and U.S. patent application Ser. No. 11/337,062, filed Jan. 20, 2006, which is also incorporated herein by reference.

Example special effect compositions that may be used in the compositions of the present invention include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as opacity or texture. In a non-limiting embodiment, special effect compositions can produce a color shift, such that the color of the coating changes when the coating is viewed at different angles. Example color effect compositions are identified in U.S. Pat. No. 6,894,086, incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

In certain embodiments, the colorant is present in the coating compositions of the present invention in an amount of 0.1 up to 30 percent by weight or, in some embodiments, 1 up to 6 percent by weight, based on the total weight of the composition.

In addition, certain embodiments of the coating compositions of the present invention comprise a diluent. Suitable diluents include organic solvents, water, and/or water/organic solvent mixtures. Suitable organic solvents include, for example, alcohols, ketones, aromatic hydrocarbons, glycol ethers, esters or mixtures thereof. In certain embodiments, the diluent is present in the coating compositions of the present invention in an amount of 5 up to 80 percent by weight, such as 30 to 50 percent by weight, based on the total weight of the composition.

The coating compositions of the present invention also comprise a long chain alkyl group containing polymerizable ethylenically unsaturated compound. As used herein, the term "long chain alkyl group" refers to an alkyl group comprising five (5) or more or, in some cases, eight (8) or more carbon atoms. Such long chain alkyl groups can be linear, cyclic, or branched.

In certain embodiments, the long chain alkyl group containing polymerizable ethylenically unsaturated compound comprises an alkyl(meth)acrylate containing from 5 to 18 carbon atoms in the alkyl portion, such as pentyl(meth)acrylate, hexyl(meth)acrylate, heptyl(meth)acrylate, 2-ethylhexyl(meth)acrylate, lauryl(meth)acrylate, stearyl(meth)acrylate, isodecyl(meth)acrylate, and/or isobornyl(meth)acrylate, among others.

In certain embodiments, the long chain alkyl group containing polymerizable ethylenically unsaturated compound comprises a (meth)acrylate having the structure:

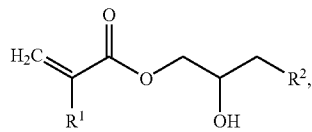

wherein $R^1$ is H or $CH_3$ and $R^2$ is

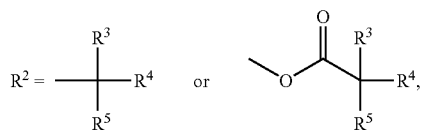

wherein $R^3$ is H or an alkyl group, $R^4$ is an alkyl group, and $R^5$ is an alkyl group containing at least four carbon atoms. Such compounds may be prepared by reacting (meth)acrylic acid with a monoepoxide having substantial hydrocarbon chain length, such as commercially available epoxidized alpha olefins of the formula:

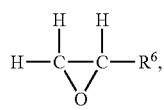

wherein $R^6$ includes a branched alkyl group having at least six carbon atoms, in some cases at least eight carbon atoms.

In certain embodiments, the terminal group in the esterifying group itself includes an ester group, such as is the case with the reaction product of (meth)acrylic acid and CARDURA E (a glycidyl ester of Versatic acid, commercially available from Resolution Performance Products, Houston, Tex.). Versatic acid is a synthetic blend of isomers of saturated tertiary alkyl monoacids having nine to eleven carbon atoms. Such a reaction yields a compound having the structure:

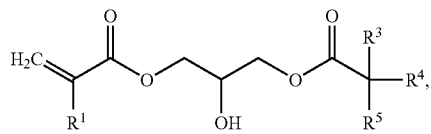

wherein the group $R^1$, $R^3$, $R^4$, and $R^5$ are as defined above. As a result, in certain embodiments of the present invention, the long chain alkyl group containing polymerizable ethylenically unsaturated compound comprises a compound having such a structure. In other embodiments, (meth)acrylate with an ester-containing terminal group may be prepared from the reaction of glycidyl(meth)acrylate with a long chain organic acid, such as Versatic acid, neodecanoic acid, or isostearic acid.

The inventors have surprisingly discovered that addition of even a relatively small amount of the previously described long chain alkyl group containing polymerizable ethylenically unsaturated compound in combination with the previously described photoinitiator can significantly improve the adhesion of coatings formed from such a composition to a wood substrate and subsequently applied radiation curable compositions and may also improve the blister resistance of such a composition. As a result, in certain embodiments, the long chain alkyl group containing polymerizable ethylenically unsaturated compound is present in the coating compositions of the present invention in an amount of 0.01 up to 10 percent by weight or, in some embodiments, 0.01 up to 5 percent by weight, or, in yet other embodiments, 0.01 up to 2 percent by weight, based on the total weight of the composition.

In certain embodiments, the compositions of the present invention comprise an additive comprising an organo-silicon or organo-fluorine containing molecule or polymer, such as an organo silane, which the inventors have found can aid in imparting nickel scrape resistance to coatings formed from the composition. Non-limiting examples of suitable organo silanes include vinyl and allyl halo, alkoxy, amino organo, acryloxy or methacrylate silanes, their hydrolysis products and polymers of the hydrolysis products and mixtures of any of these materials. Some of these silanes are disclosed in U.S. Pat. Nos. 2,688,006; 2,688,007; 2,723,211; 2,742,378; 2,754,237; 2,776,910; and 2,799,598. In certain embodiments, the coating compositions of the present invention comprise an amino silane, an epoxy silane, or, in some cases, a mixture thereof.

Non-limiting examples of amino silanes that are suitable for use in the compositions of the present invention include monoamino and diamino silanes, including γ-aminopropyltriethoxysilane, N-(trimethoxysilylpropyl)ethane diamine acrylamide and other similar mono and diamino silanes. Lubricant modified amino silanes may also be used. In certain embodiments, such monoamino silanes have an amino functionality designated by the general formula:

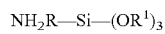

$NH_2R—Si—(OR^1)_3$ wherein R is an alkylene radical having from 2 to 8 carbon atoms and $R^1$ is a lower alkyl radical or hydrogen (the lower alkyl radical having from 1 to 5 carbon atoms, such as 1 to 2 carbon atoms). Additional examples of suitable amino silanes include aminomethyltriethoxysilane, aminopropyltrimethoxysilane, γ-aminopropyltrimethoxysilane, aminoethylaminopropyltrimethoxysilane, diaminopropyldiethoxysilane, triaminopropylethoxysilane, and the like.

Also suitable for use in the compositions of the present invention are epoxy silanes, such as those designated by the formula:

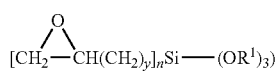

wherein $R^1$ is as described above and y is an integer having a value ranging from 1 to 6. Representative examples of such epoxy silanes include β-hydroxyethyltriethoxysilane, γ-hydroxypropyltrichlorosilane, bis-(Δ-hydroxybutyl)dimethoxysilane, Δ-hydroxybutyltrimethoxysilane, 2,3-epoxypropyltrimethoxysilane, 3,4-epoxybutyltriethoxysilane, and bis-(2,3-epoxypropyl)dimethoxysilane, glycidoxypropyltrimethoxysilane, 3,4-epoxycyclohexyltriethoxysilane.

Suitable organo-silicon containing polymers include homopolymers, copolymers or block polymers and can be of virtually any length and complexity so long as the molecule does not interfere with desired properties of the coating composition. The polymers can be, without limitation, acrylics, polyesters, polyethers, polysiloxanes, urethanes or combinations thereof. In certain embodiments, the polymer comprises the reaction product of one or more monomers in which at least one monomer has a pendant silyl group. The polymer can be a homopolymer of silyl group-containing acrylic monomers or a co-polymer of two or more acrylic monomers, one of which includes a pendant silyl group. A suitable acrylic monomer which includes a pendant silyl group is γ-methacryloxypropyltrimethoxysilane (SILQUEST® A-174 silane commercially available from OSI Specialties Inc.). Such a monomer can be reacted with a suitable vinyl monomer, such as an acrylic monomer, such as methyl(meth)acrylate, ethyl (meth)acrylate, butyl(meth)acrylate, ethylhexyl(meth)acrylate, stearyl(meth)acrylate, benzyl(meth)acrylate, cyclohexyl (meth)acrylate, lauryl(meth)acrylate, isobornyl(meth) acrylate, hydroxypropyl(meth)acrylate, hydroxyethyl(meth) acrylate, hydroxybutyl(meth)acrylate, trifluoroethyl(meth) acrylate, pentafluoropropyl(meth)acrylate, perfluorocyclohexyl(meth)acrylate, (meth)acrylonitrile, glycidyl(meth)acrylate, dimethylaminoethyl(meth)acrylate, diethylaminoethyl(meth)acrylate, (meth)acrylamide, alpha-ethyl(meth)acrylamide, N-butoxymethyl(meth)acrylamide, N,N-dimethyl acrylamide, N-methyl acrylamide, acryloyl morpholine and N-methylol(meth)acrylamide or a combination thereof.

Any number of other silanes containing at least one organic group substituted by one or more of an amino group or an epoxy group may also be used in certain embodiments of the compositions of the present invention. In certain embodiments, the coating compositions of the present invention comprise up to 2 percent by weight of organosilane or, in some embodiments, 0.1 up to 2 percent by weight of organosilane, based on the total weight of the composition.

In addition, the coating compositions of the present invention can contain other optional ingredients including ultraviolet absorbers, pigments, and inhibitors known in the art. Also, various fillers, plasticizers, flow control agents, surfactants and other known formulating additives may be used. Also useful in certain embodiments of the coating compositions of the invention is an aluminum or titanium chelating crosslinker, such as ALUSEC 510 ethyl acetoacetato-di-2-ethoxy aluminum manufactured by Manchem Ltd. or TYZOR TPT tetraisopropyl titanate manufactured by DuPont. In certain embodiments, an antiskin agent, such as methyl ethyl ketoxime may be added to, for example, improve package stability. In some cases, fillers and flatting agents, such as clay, talc, silica, and the like can be added. Suitable silicas are commercially available from W.R. Grace and Company as SYLOID 169 and from DeGussa Corporation as AEROSIL 972. Sag resistance additives, such as cellulose acetate butyrate 551-0.2 from Eastman Chemicals can also be included, as can other additives that enhance properties. Various additives, when used, typically comprise no more than 30 weight percent, such as no more than 10 weight percent, of the coating composition based on the total weight of the composition.

The coating compositions of the present invention can be applied to any of a variety of substrates. In certain embodiments, however, the coating compositions of the present invention are applied to a porous substrate, such as paper, cardboard, particle board, fiber board, wood, wood veneers, and wood products. Various woods that can be stained with the present compositions include, for example, oak, cherry, pine, and maple. These types of woods are used in the preparation of, for example, kitchen cabinets, bath cabinets, tables, desks, dressers, and other furniture, as well as flooring, such as hardwood and parquet flooring.

The coating compositions of the present invention can be applied to the substrate by any means known in the art. For example, they can be applied by brushing, dipping, flow coating, roll coating and conventional and electrostatic spraying.

Once applied, certain embodiments of the coating compositions of the present invention are allowed to soak into the porous substrate for a predetermined amount of time, and, in embodiments of the present invention wherein the composition is embodied as a wiping stain or toner, the excess stain wiped off. Multiple layers can be applied. When the coating composition of the present invention comprises a wood stain comprising an alkyd resin, as described above, the stain can then be cured by oxidative cure accomplished by allowing the coated substrate to be exposed to ambient or elevated temperature conditions. For example, the ambient or elevated temperature conditions can be those generally considered to be "air dry" or "force dry" conditions. This occurs at temperatures ranging from about 13° C. to 250° C., such as 20° C. to 150° C., or 50° C. to 90° C. Oxidative cure in the absence of accelerating conditions can take place over the course of several days to several weeks.

As will be appreciated, particularly in the treatment of wood substrates, additional layers such as a sealer and/or a topcoat may be applied over the top of a stain and/or toner layer. Therefore, certain embodiments of the present invention are directed to substrates at least partially coated with a multi-layer composite coating system. As used herein, the term "multi-layer composite coating system" refers to coating system that contains at least two coating layers applied successively over a substrate, such as a porous substrate.

The coating systems of the present invention comprise (i) a colorant layer deposited from any of the foregoing coating compositions of the present invention and (ii) at least one of a sealer and topcoat deposited from a radiation curable composition, applied over at least a portion of the colorant layer. As used herein, the term "radiation curable composition" refers to a composition that comprises a radiation curable material. As used herein, the term "radiation curable material" refers to materials having reactive components that are polymerizable by exposure to at least one of the actinic radiation sources mentioned earlier. In certain embodiments, the coating systems of the present invention comprise (i) a toner layer deposited from any of the foregoing coating compositions of the present invention, (ii) a stain layer deposited from any of the foregoing coating compositions of the present invention, wherein the stain layer is deposited over at least a portion of the toner layer, (iii) a sealer deposited from a radiation curable composition, wherein the sealer is deposited over at least a portion of the stain layer and/or toner layer, and (iv) a topcoat deposited from a radiation curable composition, wherein the topcoat is deposited over at least a portion of the sealer. In certain embodiments, the radiation curable composition from which at least one of the sealer and topcoat is deposited comprises a waterborne composition. In other embodiments, the radiation curable composition from which at least one of the sealer and topcoat is deposited comprises a composition that is substantially free of monofunctional reactive diluents and/or inert solvents, such as the sprayable compositions described in United States Published Patent Application No. 2006/0030634 A1 at [0020] to [0047], the cited portion of which being incorporated herein by reference.

As used herein, the term "sealer" refers to a protective coating applied directly to a colorant layer, such as a toner and/or stain, while a "topcoat" refers to a protective coating applied directly to the sealer. In the coating systems of the present invention, the sealer and/or topcoat are deposited from radiation curable compositions, such as compositions comprising a radiation curable material susceptible to cationic and/or free radical cure. For example, in certain embodiments the sealer and/or the topcoat are deposited from a composition comprising a polymer comprising an alkyd portion and a free radical curable portion, such as is described in United States Patent Application Publication No. 2004-0013895 A1 at [0005] to [0022], which is incorporated by reference herein.

In certain embodiments, the sealer and/or topcoat are deposited from a radiation curable composition that comprises a radiation curable material susceptible to cationic cure. In such cases, it is often desirable to include a cationic photoinitiator in the coating composition from at least one colorant layer is deposited. In other embodiments of the present invention, the sealer and/or topcoat are deposited from a radiation curable composition that comprises a radiation curable material susceptible to free radical cure. In such cases, it is often desirable to include a free radical photoinitiator in the coating composition from at least one colorant layer is deposited.

In certain embodiments of the present invention, the toner and/or stain is applied to the substrate. The stain and/or toner may or may not undergo oxidative cure before application of the sealer and/or topcoat (application of the sealer/topcoat to the uncured stain and/or toner will be understood by one skilled in the art as a "wet on wet" application). After the sealer and/or topcoat is applied, these layers are at least partially cured. While not being bound by any theory, it is believed that some radiation curable monomers present in the sealer/topcoat radiation curable compositions may migrate into the stain layer, the toner layer, and/or the porous substrate during application and prior to cure. The presence of radiation curable initiators in the stain layer, the toner layer, and/or the porous substrate may allow the radiation curable monomers that have migrated therein to be cured during cure of the sealer and/or topcoat. As a result, interlayer bonding may occur, and interlayer adhesion as well as adhesion to the substrate improved. As indicated, however, the present invention is not limited to this mechanism. As a result, the multi-layer composite coatings of the present invention may offer desirable levels of adhesion, toughness, resistance to blistering, appearance, feel and/or stain/solvent resistance, among other properties. As used herein, the term "partial cure" refers to any stage of curing between complete cure and no cure.

In certain embodiments, the substrates of the present invention are coated with a multi-layer composite coating exhibiting a tape adhesion of at least 50%, with tape adhesion testing being performed according to ASTM D-359. In certain embodiments, such coatings exhibit a tape adhesion of at least 85% or, in some cases, 100%.

In certain embodiments, the substrates of the present invention are coated with a multi-layer composite coating exhibiting nickel scrape resistance of at least 8. Nickel scrape resistance is an evaluation of a coating system's resistance to gouge. As used herein, nickel scrape resistance is tested using five replicates on a single sample and with results reported in comparison to a control coating system. The test may be conducted using a United States Government 5 cent coin without obviously worn surfaces. The nickel is grasped between the thumb and forefinger and, using medium to firm pressure, the nickel edge is scraped over the coated surface. The pressure # required to gouge the coated surface is assigned a whole number from 1 to 10 with 1 being minimal effort and 10 being maximum effort.

As will be appreciated, the present invention is further directed to methods for improving the adhesion of a multi-layer composite coating system to a porous substrate, which can be measured by the tape adhesion test described earlier. These methods of the present invention comprise the step of including a radiation cure initiator and a long chain alkyl group containing polymerizable ethylenically unsaturated compound in a wiping stain and/or toner composition from which a colorant layer of the multi-layer composite coating system is deposited, wherein the multi-layer coating system comprises at least one coating layer deposited from a radiation curable composition.

The present invention also provides methods for at least partially coating a porous substrate with a multi-layer composite coating system. These methods comprise: (a) applying a colorant layer to a porous substrate; and (b) applying at least one of a sealer and topcoat, deposited from a radiation curable composition, over at least a portion of the colorant layer. In these methods of the present invention, the colorant layer is deposited from a coating composition of the present invention. The sealer and/or topcoat coating compositions can then be cured. Thus, for example, the sealer and/or topcoat compositions may be cured by irradiation with actinic radiation as is known to those skilled in the art. In certain embodiments, curing can be completed in less than one minute.

In certain embodiments, an ultraviolet light source having a wavelength range of 180 to 4000 nanometers may be used to cure the sealer and/or topcoat compositions. For example, sunlight, mercury lamps, arc lamps, xenon lamps, gallium lamps, and the like may be used. In one example, the sealer and/or topcoat compositions may be cured by a medium pressure mercury lamp having an intensity of 48 to 360 W/cm, for a total exposure of 100 to 2000 mJ/cm$^2$, such as 500 to 1000 mJ/cm$^2$ as measured by a POWERMAP UV Radiometer commercially available from EIT Inc., Sterling, Va.

Whereas particular embodiments of this invention have been described above for purposes of illustration, it will be evident to those skilled in the art that numerous variations of the details of the present invention may be made without departing from the invention as defined in the appended claims.

Illustrating the invention are the following examples that are not to be considered as limiting the invention to their details. All parts and percentages in the examples, as well as throughout the specification, are by weight unless otherwise indicated.

EXAMPLE 1

Samples A-D were prepared using the ingredients and amounts (in grams) shown in Table 1. The samples were prepared by adding the materials to a blending vessel and agitating with an air motor equipped with a Cowles blade for 20-30 minutes.

TABLE 1

| Material | Toner A | Toner B | Stain C | Stain D |
|---|---|---|---|---|
| Isobutyl acetate | 91.399 | 91.399 | — | — |
| Propylene glycol monomethyl ether acetate | 18.287 | 18.287 | — | — |
| Mineral spirits | — | — | 429.580 | 429.580 |
| Bentone SD-1[1] | — | — | 8.149 | 8.149 |
| Beckosol 1247-T-70[2] | — | — | 36.294 | 36.294 |
| Cymel U-80[3] | — | — | 3.718 | 3.718 |
| Kaolin Clay[4] | — | — | 28.178 | 28.178 |
| Methyl ethyl ketoxime | — | — | 1.213 | 1.213 |
| Paraloid B-66[5] | 9.668 | 9.668 | — | — |
| 2,4,6-trimethylbenzoyl-diphenyl phosphine oxide | 2.625 | 2.625 | — | — |
| Ethanol | 182.739 | 182.739 | 4.067 | 4.067 |
| Ethyl acetate | 125.049 | 125.049 | — | — |
| Acetone | 246.049 | 246.049 | — | — |
| Tint-AYD AL 519 Burnt Umber[6] | — | — | 124.490 | 124.490 |
| AL673 Deep Organic Red Tint-AYD[7] | — | — | 12.449 | 12.449 |
| AL317H Tinting Black Tint-AYD[8] | — | — | 2.385 | 2.385 |
| Tint-AYD AL 620 Red Oxide Light[9] | — | — | 4.084 | 4.084 |
| Neozapon Black NBX51[10] | — | — | 5.727 | 5.727 |
| VM&P Naptha HT[11] | — | — | 37.261 | 37.261 |
| Isopropanol | — | — | 45.000 | 45.000 |
| Neozapon Red NB 335 A[12] | 4.582 | 4.582 | — | — |
| Neozapon Orange NB 251 A[13] | 1.542 | 1.542 | — | — |
| Irgasperse Yellow 2R-U[14] | 2.863 | 2.863 | — | — |
| Irgasperse Brown 4R-U[15] | 1.947 | 1.947 | — | — |
| 6N1216 burnt umber nitrocellulose paste[16] | 27.369 | 27.369 | — | — |
| 6R305D quin maroon nitrocellulose paste[17] | 4.301 | 4.301 | — | — |
| Long chain alkyl group containing polymerizable ethylenically unsaturated compound[18] | — | 7.184 | — | 7.426 |

[1]Organoclay supplied by Elementis Specialties, Inc.
[2]Short oil soya alkyd resin supplied by Reichhold Chemicals, Inc.
[3]Butylated urea-formaldehyde resin supplied by Cytec Industries, Inc.
[4]Hydrous aluminum silicate supplied by BASF Catalysts, LLC.
[5]Acrylic polymer supplied by Rohm & Haas Co.
[6]Long oil alkyd based tint paste supplied by Elementis Specialties, Inc.
[7]Long oil alkyd based tint paste supplied by Elementis Specialties, Inc.
[8]Long oil alkyd based tint paste supplied by Elementis Specialties, Inc.
[9]Long oil alkyd based tint paste supplied by Elementis Specialties, Inc.
[10]Chromium III based black dye supplied by BASF Coporation.
[11]Supplied by Shell Chemical Co.
[12]Chromium III based red 122 dye supplied by BASF Coporation.
[13]Chromium III based orange 54 dye supplied by BASF Coporation.
[14]C.I. Acid Yellow 220 dye supplied by Ciba Pigments.
[15]C.I. Acid Brown 282 dye supplied by Ciba Pigments.
[16]Nitrocellulose based tint paste supplied by Penn Color.
[17]Nitrocellulose based tint paste supplied by Penn Color.
[18]The reaction product of (meth)acrylic acid and CARDURA E, as described in U.S. Pat. No. 6,458,885 at col. 3, lines 19-51.

EXAMPLES 2-5

Four pieces of solid cherry wood were sanded with 180 grit sand paper and then coated with a combination of a toner and a stain as described in Table 2. The toners were applied at ~10 microns and the stains were applied at ~100 microns. Immediately after application of the stain, the wood pieces were thorough wiped with a rag to remove access stain from the surface of the wood. After the stain was wiped the pieces of wood were cured at 140° F. for 15 minutes. After this curing time, the pieces were then sealed with 10-15 microns of a commercially available PPG sealer sold under the trade name R1782Z49. The sealed pieces were immediately cured with 800 mJ of UV light. After UV curing of the sealer, the pieces were sanded with ultra fine sandpaper and coated with 75-85 microns of A1385Z83, commercially available from PPG Industries, Inc. The pieces were then dehydrated at 140° F. for 8 minutes and cured with 800 mJ of UV light. All paints were applied using an Kremlin HTI spray gun.

TABLE 2

| | Example 2 | Example 3 | Example 4 | Example 5 |
|---|---|---|---|---|
| Toner Used | A | A | B | B |
| Stain Used | C | D | C | D |

Sixty minutes after UV curing the pieces were tested for adhesion according to ASTM D3359. The results of this testing are shown in Table 3.

TABLE 3

| | Example 2 | Example 3 | Example 4 | Example 5 |
|---|---|---|---|---|
| Adhesion | 0B | 2B | 4B | 4B |

It will be appreciated by those skilled in the art that changes could be made to the embodiments described above without departing from the broad inventive concept thereof. It is understood, therefore, that this invention is not limited to the particular embodiments disclosed, but it is intended to cover

We claim:
1. A wood stain or wood toner composition comprising:
(a) a film-forming resin,
(b) a colorant,
(c) 0.01 up to 5 percent by weight, based on the total weight of the composition, of a long chain alkyl group containing polymerizable ethylenically unsaturated compound comprising a (meth)acrylate having the structure:

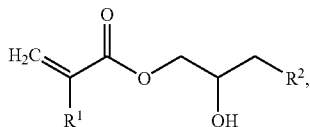

wherein $R^1$ is H or $CH_3$ and

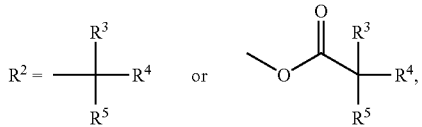

wherein $R^3$ is H or an alkyl group, $R^4$ is an alkyl group, and $R^5$ is an alkyl group containing at least four carbon atoms, and
(d) a diluent.

2. The composition of claim 1, wherein the composition is a wiping stain or wiping toner.

3. The composition of claim 1, wherein the film-forming resin comprises an alkyd resin and/or a cellulosic resin.

4. The composition of claim 1, further comprising:
(e) a radiation cure initiator.

5. The composition of claim 4, wherein the radiation cure initiator comprises a photoinitiator selected from a cationic photoinitiator and/or a free radical photoinitiator.

6. The composition of claim 5, wherein the photoinitiator comprises 2,4,6-trimethylbenzoyldiphenylphosphine oxide.

7. The composition of claim 1, further comprising an additive comprising an organo-silicon and/or organo-fluorine containing molecule and/or polymer.

8. The composition of claim 7, wherein the organo-silicon containing molecule and/or polymer comprises an organo silane.

9. The composition of claim 8, wherein the organo silane comprises an amino silane, an epoxy silane, or a mixture thereof.

10. The composition of claim 1, wherein the long chain alkyl group containing polymerizable ethylenically unsaturated compound comprises a (meth)acrylate having the structure:

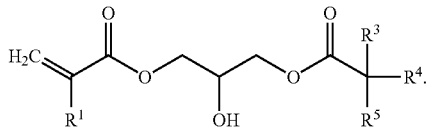

11. The composition of claim 1, wherein the long chain alkyl group containing polymerizable ethylenically unsaturated compound is present in the composition in an amount of 0.01 up to 1 percent by weight, based on the total weight of the composition.

12. A method for improving the adhesion of a multi-layer composite coating system to a porous substrate comprising including a radiation cure initiator and a long chain alkyl group containing polymerizable ethylenically unsaturated compound in a wiping stain and/or toner composition from which a colorant layer of the multi-layer composite coating system is deposited, wherein the multi-layer coating system comprises at least one coating layer deposited from a radiation curable composition, and
wherein the long chain alkyl group containing polymerizable ethylenically unsaturated compound is present in the wiping stain and/or toner composition in an amount of 0.01 up to 5 percent by weight, based on the total weight of the composition and comprises a (meth)acrylate having the structure:

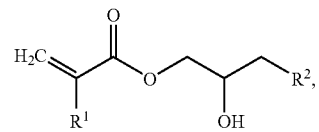

wherein $R^1$ is H or $CH_3$ and

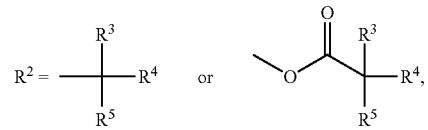

wherein $R^3$ is H or an alkyl group, $R^4$ is an alkyl group, and $R^5$ is an alkyl group containing at least four carbon atoms.

13. A multi-layer composite coating system comprising a colorant layer and at least one of a sealer layer and a topcoat layer, wherein the colorant layer is deposited from a coating composition comprising a film-forming resin, a radiation cure initiator, a colorant, 0.01 up to 5 percent by weight, based on the total weight of the composition, of a long chain alkyl group containing polymerizable ethylenically unsaturated compound comprising a (meth)acrylate having the structure:

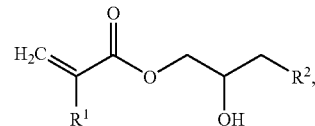

wherein $R^1$ is H or $CH_3$ and

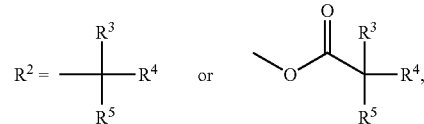

wherein $R^3$ is H or an alkyl group, $R^4$ is an alkyl group, and $R^5$ is an alkyl group containing at least four carbon atoms, and a solvent, and wherein at least one of the sealer layer and topcoat layer is deposited from a radiation curable composition, applied over at least a portion of the colorant layer.

* * * * *